No. 724,062. PATENTED MAR. 31, 1903.
L. TRABUE.
TENSION BAND FOR BALING PRESSES.
APPLICATION FILED JUNE 13, 1902.
NO MODEL.
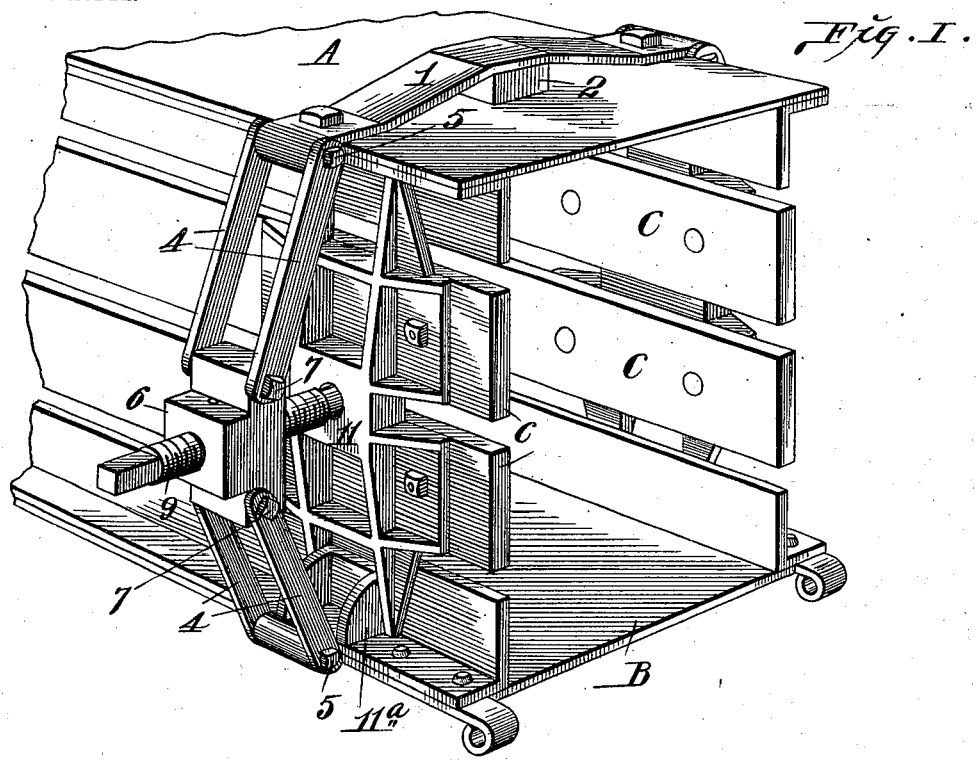
Fig. I.
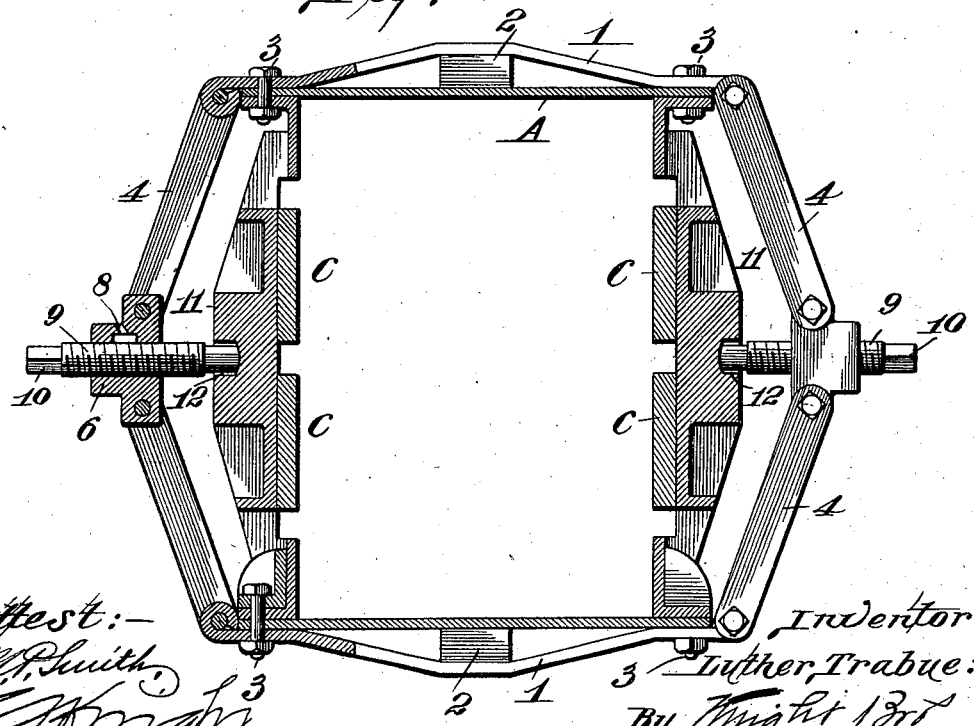
Fig. II.
Attest:—
W. P. Smith
F. F. Knight
Inventor:
Luther Trabue
By Knight Bros.
Atty's.

UNITED STATES PATENT OFFICE.

LUTHER TRABUE, OF GIRARD, ILLINOIS, ASSIGNOR TO THE OHIO HAY PRESS COMPANY, OF BELLEVUE, OHIO, A CORPORATION.

TENSION-BAND FOR BALING-PRESSES.

SPECIFICATION forming part of Letters Patent No. 724,062, dated March 31, 1903.

Application filed June 13, 1902. Serial No. 111,439. (No model.)

*To all whom it may concern:*

Be it known that I, LUTHER TRABUE, a citizen of the United States, residing in Girard, in the county of Macoupin and State of Illinois, have invented certain new and useful Improvements in Tension-Bands for Baling-Presses, of which the following is a full, clear, and exact description, reference being had to the accompanying drawings, forming part of this specification.

My invention relates to that class of bands applied to baling-press boxes for the purpose of providing the requisite tension in the walls of the box.

My invention consists in features of novelty hereinafter fully described, and pointed out in the claim.

Figure I is a perspective view of the end of a baling-press box with my band applied thereto. Fig. II is a transverse section of the box and band.

1 designates truss-straps fixed to the top and bottom walls A and B of a baling-press box, the truss-straps resting against blocks 2, interposed between the straps and the top and bottom of the press-box. The truss-straps are secured to the top and bottom walls A and B by bolts 3 or other suitable means of attachment.

4 designates links pivoted to the ends of the straps 1 by bolts 5, which pass through ears at the ends of the straps.

6 designates nuts to which the links 4 are hinged by bolts 7, each nut being provided with an oil-reservoir 8.

9 designates adjustment-screws arranged to turn in screw-threads contained by the nuts 6. Each adjustment-screw 9 is provided with a wrench-head 10.

11 designates pressure-bars adapted to bear against the sides of the press-box to hold the side boards C inwardly with the amount of pressure desirable for baling hay. Each pressure-bar is bifurcated at its ends to straddle guides 11ª, fixed to the top and bottom of the press-box, as seen most clearly in Fig. I, so that the bars in their inward and outward movement are held and guided uprightly. Each pressure-bar is provided with a socket 12, that receives the inner end of the adjacent adjustment-screw 9.

The operation of this tension-band is obvious, it being only necessary in securing the desired tension against the side boards C of the baling-box to rotate the adjustment-screws 9 inwardly or outwardly to permit like movement of the pressure-bars 11. The device is such as to render the application and release of power or pressure against the side boards C easy and quick, and by reason of the truss-straps and the manner of connecting the nuts 6 to the truss-straps by the links 4 all stretching action in the band is positively avoided. Furthermore, the construction of the device enables its use without a division-board and does not require that any hay be kept in the press-box to keep it from falling down, as the nuts are held to their places constantly by the links 4, that support them.

I claim as my invention—

The combination with a baling-press box having yielding side boards, of trussed straps secured to the top and bottom of said press-box, links pivoted to said trussed straps, nuts to which said links are hinged, adjustment-screws mounted in said nuts, pressure-bars positioned against said side boards and having bifurcated ends, and guides fixed to the press-box and straddled by the bifurcated ends of said pressure-bars, substantially as described.

LUTHER TRABUE.

In presence of—
JESSE VICKER,
W. C. BUSAM.